United States Patent [19]
Stansbury

[11] 3,749,543
[45] July 31, 1973

[54] APPARATUS FOR FORMING BELLED PIPE COUPLINGS

[75] Inventor: Patrick H. Stansbury, Spokane, Wash.

[73] Assignee: ASC Industries, Inc., Spokane, Wash.

[22] Filed: June 21, 1971

[21] Appl. No.: 154,897

[52] U.S. Cl. .................. 425/393, 249/184, 425/392
[51] Int. Cl. ............................................ B29c 17/00
[58] Field of Search ............................ 425/393, 392; 249/175, 178, 184

[56] References Cited
UNITED STATES PATENTS

| | | | |
|---|---|---|---|
| 3,360,826 | 1/1968 | Lorang | 425/393 X |
| 3,425,093 | 2/1969 | Ansette | 425/393 X |
| 3,553,780 | 1/1971 | Kuhlemann | 425/393 X |
| 3,677,684 | 7/1972 | Platz | 425/393 |

*Primary Examiner*—Richard B. Lazarus
*Attorney*—Greek Wells, Richard J. St. John et al.

[57] ABSTRACT

An apparatus for forming a plastic pipe bell end of predetermined inner configuration including a peripheral groove for receiving a sealing gasket. The apparatus includes a segmented die having four axial members and a center core element. The die is inserted into the heated end of a length of plastic pipe to permit the pipe to be molded about the die in the desired configuration. After cooling of the pipe, the core element is removed and the axial members are disassembled within the pipe and retracted. The disclosed method relates to the insertion of the die having the desired interior pipe configuration, the cooling of the pipe about the die, and the progressive removal of the core and die elements.

8 Claims, 7 Drawing Figures

Patented July 31, 1973          3,749,543

Patented July 31, 1973 3,749,543

APPARATUS FOR FORMING BELLED PIPE COUPLINGS

BACKGROUND OF THE INVENTION

The present apparatus and method arose from an effort to simplify and expedite the forming of enlarged bell ends on plastic pipe for irrigation or water distribution purposes where moderate pressures are encountered within the pipe during intended use. The interior pressures make necessary the use of sealing gaskets which must be fitted within peripheral interior grooves about the belled ends of the pipe.

Plastic pipe is conventionally formed by extrusion practices, making it necessary to form the bell end on each length of pipe after the pipe has been extruded. The end of the pipe must be reheated and reformed with subsequent cooling. The reforming of the pipe end should preferably result in little or no reduction in pipe wall thickness, which might eventually detract from the desired long-term strength of the pipe sections.

Most prior methods of forming bell ends on plastic pipes involve the insertion of an internal die member and the expansion of the die member to form the necessary interior groove about the pipe circumference. Examples are shown in U.S. Pat. No. 3,425,093, granted, Feb. 4, 1969, which utilizes a pneumatic system to inflate a tube to expand a deformable ring within the pipe. U.S. Pat. No. 3,432,887, whice uses an interior mandril that directs air under pressure directly to the inside pipe surfaces to force the pipe outwardly against the walls of a female mold, and U.S. Pat. No. 3,248.756, which uses tapered interior elements to progressively expand axial segments of a die against the inner wall of the pipe. U.S. Pat. No. 3,377,659 shows an interior die including a deformable ring used to mold the groove about the pipe end, the ring being dislodged for removal purposes when the die is retracted.

One object of the present invention is to provide an apparatus and method whereby a permanent die, preferably made of metal, can be reused an indefinite number of times to mechanically form the bell end of plastic pipe for maximum accuracy. The die is inserted within the heated pipe while in a fully assembled condition. The compressive forces exerted against the interior walls of the pipe during insertion of the enlarged die are utilized to minimize wall thickness reduction due to the resulting radial expansion of the pipe dimensions. The interior die is constructed so as to be readily disassembled while within the pipe end and is removed from the pipe after cooling of the formed bell end section.

SUMMARY OF THE INVENTION

The apparatus described in detail below is designed to form a bell end of pre-determined inner configuration in plastic pipe that has been heated to a temperature at which it is deformable. The apparatus comprises a die having multiple axial die members which, when assembled about a removable core, have an exterior configuration that complements the desired pipe interior configuration. The core extends axially between the die members and is abutted by each die member when the die is assembled. The core is axially movable from between the die members. One die member is radially movable with respect to the remaining members after removal of the core, thereby permitting disassembly of the die members while they remain within the bell end of the plastic pipe that is formed about them.

The disclosed method essentially comprises the steps of inserting the fully assembled die, removing the interior die core after cooling of the pipe section, unlocking the die members by moving one member radially inward and subsequently disassembling the remaining die members within the formed bell end section of the pipe.

It is one object of this invention to provide a mechanically simple apparatus and method for forming a bell end section within plastic pipe, particularly where the sections include an annular interior groove about the pipe circumference.

Another object of the invention is to provide a permanent die that can be fabricated entirely of metal so as to assure maximum accuracy about the interior pipe surfaces molded while in contact with the die.

Another object of the invention is to eliminate the need for complicated pneumatic or other expanding devices within the die inserted into the pipe end.

Another object of the invention is to minimize elongation of the expanded pipe end and subsequent reduction in wall thickness by forming the bell end of heated plastic pipe during insertion of a die having an original exterior configuration complementary to the desired interior pipe surface configuration.

The invention will be better understood and additional objects and advantages will become more apparent when reference is made to the following description of a preferred embodiment of the invention and the accompanying drawings which illustrate the apparatus by which the present method is achieved.

DESCRIPTION OF THE PREFERRED EMBODIMENT

This disclosure relates to an apparatus and method particularly designed toward the forming of enlarged bell ends including a groove or interior recess in pipes such as cold water or irrigation supply pipes made of polyvinyl chloride and similar plastic materials. After the cylindrical pipe has been formed by conventional extrusion processes, one end is heated to soften the required length of pipe that will comprise the bell end. An interior die is then inserted into the end of the pipe to produce the required interior pipe wall configuration. The pipe end section is then permitted to cool about the die so as to mold the wall of the pipe in a configuration conforming to the interior die shape. Since plastic pipe when heated has a tendency to return to its original configuration, it conforms to the outer surface of the die. The inner die must then be removed from the pipe for reuse.

Figure 1:
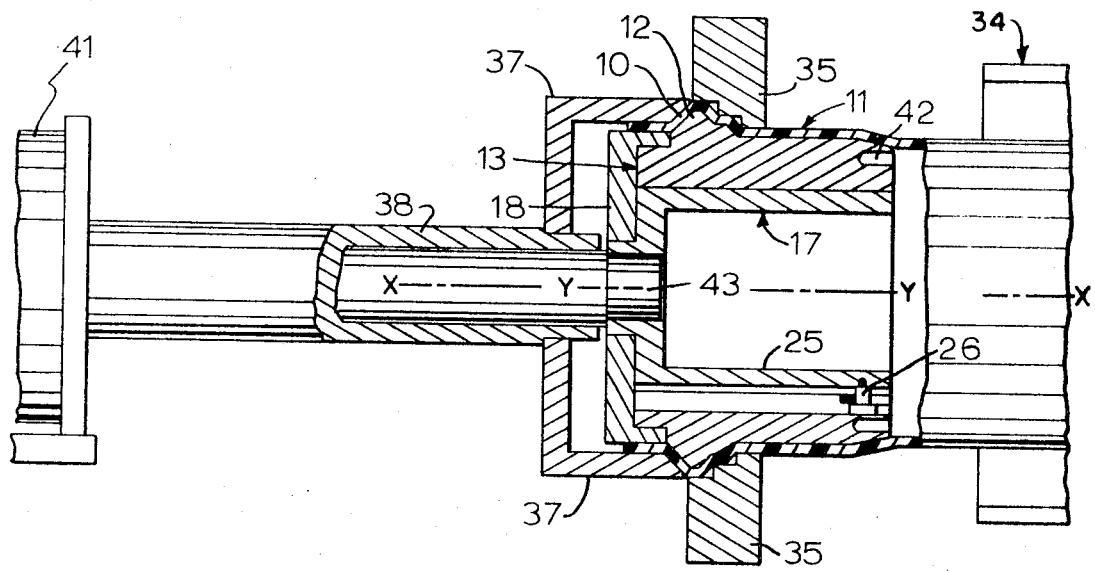
FIG. 1 is a side view showing the bell end of a pipe and the cooperative die members in longitudinal section, illustrating the forming of the pipe about the present die.
Figure 2:
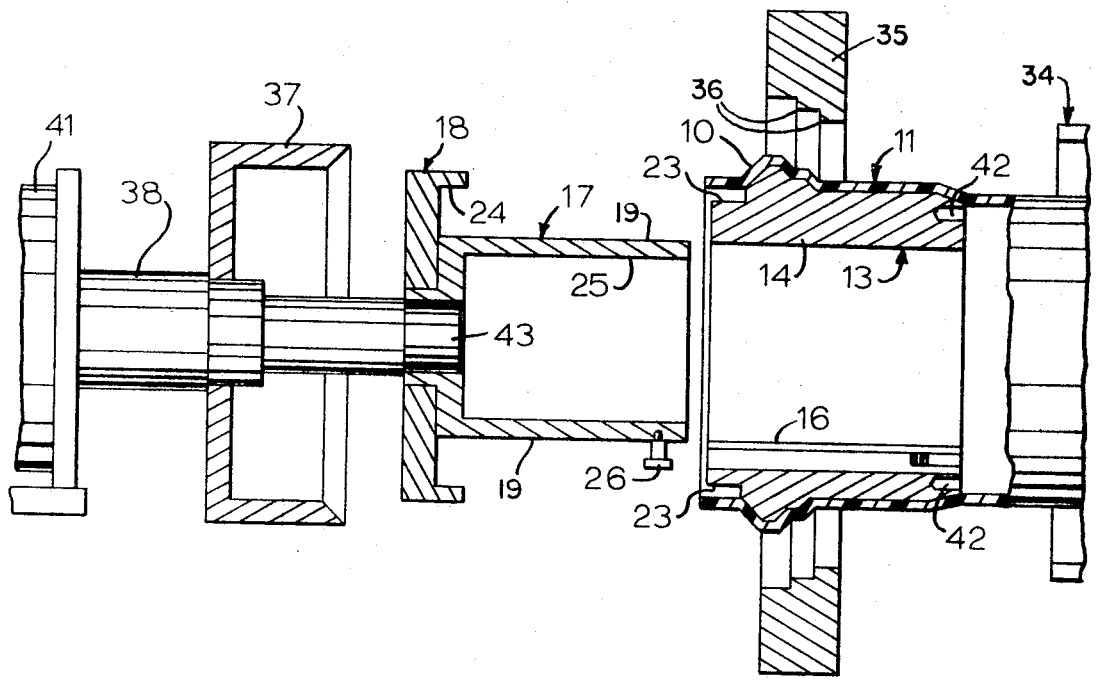
FIG. 2 is a view similar to FIG. 1, illustrating the apparatus after retraction of the exterior die elements and inner die core.

FIGS. 1 and 2 illustrate the forming of the pipe and removal of the die elements, respectively. The pipe itself, which is in an elongated cylindrical form centered about pipe axis X—X (FIG. 1), is indicated typically by the numeral 11. The enlarged bell end of the pipe formed by the apparatus and method of this disclosure is shown at 10. The desired end configuration of the pipe includes a circumferential interior groove 12 or recess having an inside shape designed to accommodate a particular sealing gasket (not shown) or other resilient sealing member adapted to resiliently engage the exterior surface of a length of pipe subsequently received within the bell end 10. The particular groove configuration shown in FIGS. 1 and 2 includes a stepped inside surfaces, but it is to be understood that the present disclosure is not limited to any specific groove configuration and may be adapted to any desired annular groove shape.

The present die assembly includes an internal segmented die 13 that has five basic components. These are a center core 17, which is centered along a longitudinal die axis Y—Y (FIG. 1,4). The core 17 includes an attached circular collar 18 spaced radially about the core 17 at its outer end. The collar 18 is preferably bolted to core 17 to permit replacement when necessary. Movably located about the core 17 are a top die element 14, a pair of side die elements 15, which are mirror images of one another, and a lower die element 16. The elements 14 through 16 abut core 17 and are normally located in the assembled die configuration in the manner shown in FIGS. 1 and 4.

Figure 4:
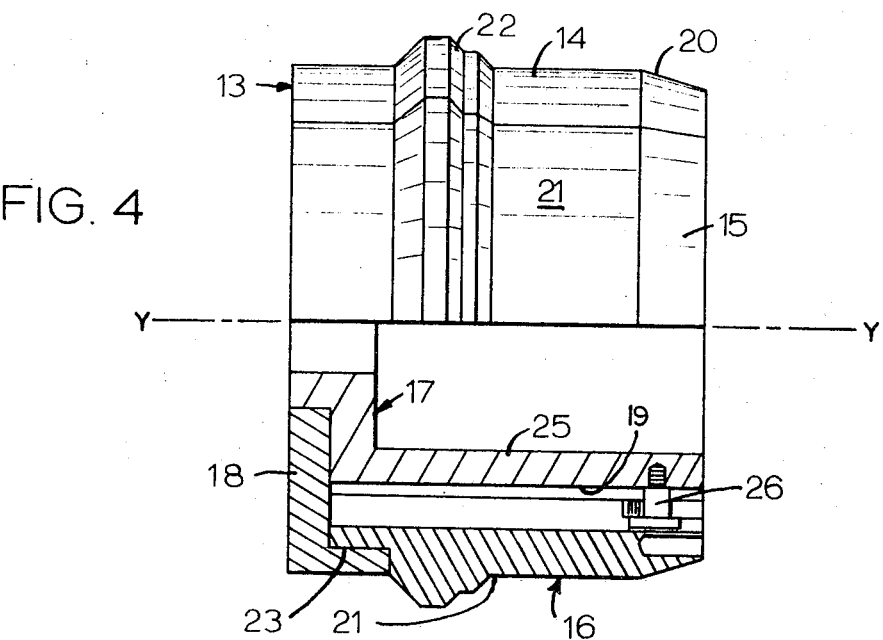
FIG. 4 is a side view of the assembled inner die, the lower half of the view showing the elements in longitudinal section along a vertical center plane.
Figure 5:
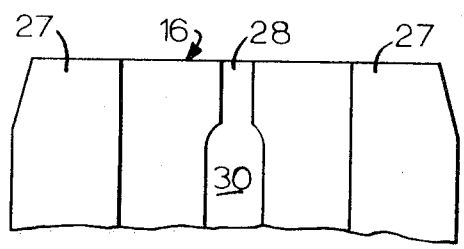
FIG. 5 is a fragmentary top view looking downward at the inner end of the lower die element substantially along line 5—5 in FIG. 3.

The exterior surface configuration of the assembled internal segmented die 13 is centered about the die axis Y—Y and is complementary to the desired interior surface configuration selected for the bell end 10 of pipe 11. Referring to FIG. 4, this surface configuration, which is continuous about the entire circular cross-section of the assembled die 13, includes a tapered inner end surface 20 that facilitates insertion of the die 13 within pipe 11. Surface 20 provides a gentle transition in the formed pipe between the normal diameter of pipe 11 and the extended diameter necessary for the reception of the meeting pipe end that will be inserted within the bell end 10. Surface 20 leads to a cylindrical surface 21 having an inside diameter substantially conforming to the exterior diameter of pipe 11. The surface 21 is interrupted by a protruding enlarged shoulder 22 having a configuration complementary to the desired interior configuration of the pipe groove 12. The outer end of the die surface is presented by the cylindrical collar surface 24 about collar 18. The collar 18 in turn fits flush within a cylindrical outer ledge 23 formed about the die elements 14, 15 and 16. When core 17 and collar 18 are in place as shown in FIGS. 1 and 4, the elements 14, 15 and 16 are held in their desired positions about core 17 by engagement of the continuous circular collar 18 against the ledge 23 that is formed continuously about their respective outer axial ends.

Figure 7:
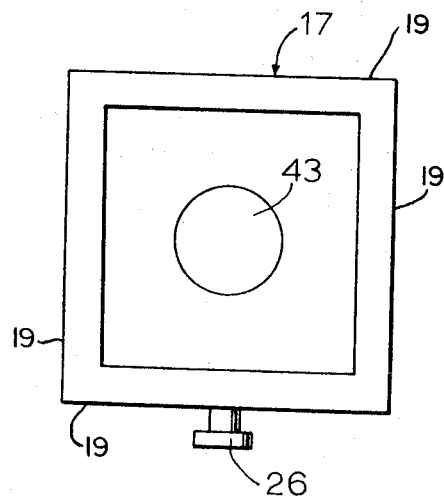
FIG. 7 is an end view of the core as seen from the right in FIG. 4.

Taking the various internal die parts in detail, the core 17 includes a central arbor 25 that has a square configuration when viewed from the end (FIG. 7). The arbor 25 includes exterior outwardly facing surface areas 19 which extend along planes parallel to die axis Y—Y. Arbor 25 is preferably hollow and open at its inner end to facilitate heat dissipation. An alignment button 26 is centered at the underside of arbor 25 adjacent its inner end. Button 26 presents an enlarged circular shoulder spaced outwardly from the lower surface of arbor 25 and provides vertical support for the inner end of the assembled lower die element 16.

The lower die element 16 includes upwardly facing horizontal support ledges 27 at its respective sides, these ledges 27 being formed in a single plane extending the full axial length of the element 16. They provide vertical support for the side die elements 15 in the assembled die unit. The upper surface of the lower die element 16 includes a recessed keyway 28 at its inner end adapted to receive the alignment button 26. The keyway 28 is in open communication with a continuous enlarged groove 30 that extends axially to the outer end of the lower die element 16 to facilitate removal of core 17 and the alignment button 26 when the core 17 is retracted as shown in FIG. 2.

The side elements 15 each include horizontal lower edges 31 adapted to rest on the support ledges 27 of the lower die element 16. The upper end of each side die element 15 includes a continuous vertical upper edge shown at 32 which is coplanar with the side edges of the core 17 when the die is assembled.

The top die member 14, which is the key segment of the die assembly, terminates at each side along vertical side edges 33 adapted to abut the vertical upper edges 32 of side die element 15. Edges 33 are coplanar with the vertical side edges of core 17.

Figure 3:
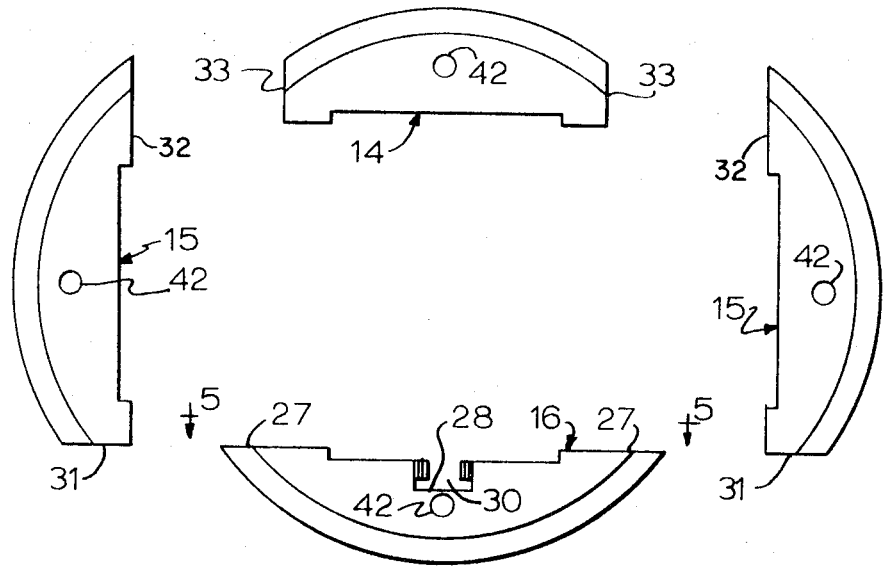
FIG. 3 is an exploded inner end view showing the four axial die elements.
Figure 6:
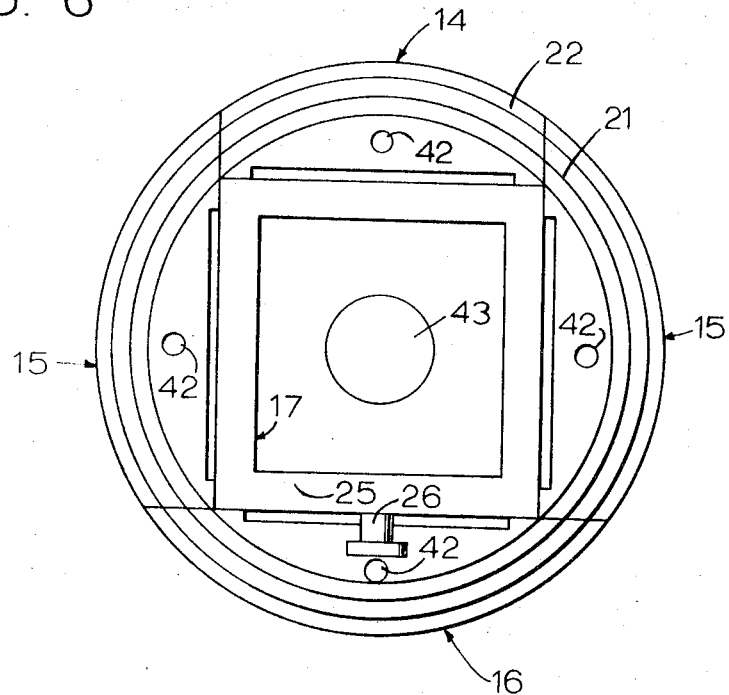
FIG. 6 is an assembly view of the die as seen from the right in FIG. 4.

Thus each die element 14, 15 and 16 includes inner surfaces that abut the sides of the core 17 along surface areas 19 and also include complementary edges that abut those die elements adjacent to it. As can be seen in FIGS. 3 and 6, when it is free of engagement by core 17 and collar 18, the top die element 14 can be moved radially downward between the side die elements 15 and axially pulled from the die assembly. The side die elements 15 can then be moved inwardly to clear the formed groove 12 in pipe 11. After removal of die elements 14 and 15, the lower die element 16 can then be raised slightly to permit its axial removal from the end of pipe 11. Axial movement of the die element 14, 15 and 16 is facilitated by axial apertures 42 designed to receive a simple removing rod or tool (not shown). As previously described, each die element 14, 15 and 16 also includes the cylindrical outer ledge 23 about its segmented periphery, adapted to be engaged by the complementary collar 18 affixed to core 17.

In the use of this device, the various parts of the die 13 are first assembled in the configuration shown in FIGS. 4 and 6. The end of pipe 11 is heated by conventional methods to permit expansion and necessary stretching of the pipe end to adequately form the bell 10 following insertion of the assembled die 13. Core 17 and the die elements assembled thereon are fixed to the outer end of a piston rod 43 controlled by an air cylinder 41. The end of pipe 11 is supported by a releasable pipe clamp shown schematically at 34, the center axis of pipe 11 being aligned coaxially with the center axis of piston rod 43 and the die axis Y—Y of die 13 fixed thereto. The tapered inner end surface 20 about the die 13 is then slipped into the open end of pipe 11 and the assembled die 13 is then forced inwardly along the pipe interior to the position shown in FIG. 1. The compressive forces exerted inwardly along the axis of pipe 11 due to the insertion of the enlarged die 13 minimize stretching of the pipe wall and subsequent reduction of pipe wall thickness due to enlargement of the bell end 10.

Following insertion of the die 13, the exterior of pipe 11 is engaged about its entire circumference by external die sections 35 which are split along radial planes and which compressively engage the pipe 11 outwardly of the groove 12. The die sections 35 include interior facing corners 36 which act to insure contact of the inside pipe walls against the corresponding corners about the shoulder 22 on die 13. Pipe 11 is also engaged by an axially movable external die ring 37 mounted on a hollow shaft 38 also controlled by air cylinder 41. Ring 37 serves to push the pipe 11 inwardly in intimate contact against the surfaces of shoulder 22.

After the pipe has cooled, the die is released as shown in FIG. 2. The external die sections 35 are opened and the external die ring 37 is retracted. The core 17 and collar 18 are axially retracted outwardly of pipe 11. The top die element 14 can then be dropped radially downward between the side die elements 15 and pulled axially from the pipe 11 by a rod or tool engaged within its axial recess 42. Following removal of top die element 14, the side die elements 15 can be individually tipped inwardly and pulled from the pipe. Finally, the lower die element 16 can be raised slightly and pulled from the pipe also. The die elements 14, 15 and 16 can then be subsequently assembled for insertion into the next pipe end. The pipe clamp 34 is released and processing of the bell end 10 is then completed.

Various modifications might be obvious from the above disclosure and the details set out in this description are not intended to limit the scope of the disclosed invention except as defined below.

Having thus described my invention, I claim:

1. In an apparatus for belling the ends of plastic pipe having a central pipe axis, a die comprising:
   a longitudinal core element centered about a longitudinal die axis adapted to be coaxial with the pipe axis of a pipe end to be belled, said core element having exterior outwardly facing longitudinal surface areas parallel to the die axis;
   a plurality of radial segmented die members arranged circumferentially about the core element and supported, when assembled, by engagement of the outwardly facing longitudinal surface areas of the core element, the die members extending longitudinally coextensive with one another and having complementary outer surfaces which when assembled about the core element, define cylindrical surface configurations centered about the die axis and complementary to the desired inner surface configuration of the belled pipe end;
   said core element being longitudinally removable from within the assembled die members;
   one of said die members being radially movable between the die members to each side thereof following removal of the core element, to thereby permit disassembly of the die members while within a belled pipe end.

2. An apparatus as set out in claim 1 wherein a first corresponding longitudinal end of each die member is stepped to form a continuous peripheral ledge of reduced radial dimension about the assembled die members;
   said core element including a radial extension formed at one longitudinal end thereof and having a peripheral collar projecting longitudinally toward the die members, the collar having an inner surface configuration formed thereon complementary to the continuous peripheral ledge of the assembled die members, whereby the stepped end of said die members are radially located by engagement of the ledge within the inner surface of the collar.

3. An apparatus as set out in claim 1 wherein a first corresponding longitudinal end of each die member is stepped to form a continuous peripheral ledge of reduced radial dimension about the assembled die members;
   said core element including a radial extension formed at one longitudinal end thereof and having a peripheral collar projecting longitudinally toward the die members, the collar having an inner surface configuration formed thereon complementary to the continuous peripheral ledge of the assembled die members, whereby the stepped end of said die members are radially located by engagement of the ledge within the inner surface of the collar;
   said radial extension and said collar having a cylindrical outer surface centered about the die axis and located so as to complete the desired exterior configuration of said die when the die members are assembled on said core element with the ledge formed thereon engaged within the inner surface of the collar.

4. An apparatus as set out in claim 1 wherein said one die member abuts the die members adjacent to it along spaced plane surfaces parallel to one another.

5. An apparatus as set out in claim 1 comprising four complementary die members;
   said one die member abutting the two die members at each side thereof along spaced plane surfaces parallel to one another;
   said two die members further abutting the remaining die member along a plane surface perpendicular to said spaced plane surfaces.

6. An apparatus as set out in claim 5 wherein said remaining die member is located elevationally below said one die member and said spaced plane surfaces each lie in vertical planes.

7. An apparatus as set out in claim 6 wherein said core element and said die members each have formed thereon complementary interfitting surfaces which prevent radial displacement of corresponding ends of the die members relative to the core element when assembled thereon, while permitting removal of the core element from the assembled die members by longitudinal movement of the core element relative to the die members along the die axis.

8. An apparatus as set out in claim 6 wherein said core element and said die members each have formed thereon complementary interfitting surfaces which prevent radial displacement of corresponding ends of the die members relative to the core element when assembled thereon, while permitting removal of the core element from the assembled die members by longitudinal movement of the core element relative to the die members along the die axis;
   and longitudinally engageable means on the core element and said remaining die member for interlocking with the core element the end of the remaining die member opposite to its interfitting surface for preventing radial displacement of the remaining die member relative to the core element when mounted on the core element.

* * * * *